(12) United States Patent
Peng (10) Patent No.: US 8,091,658 B2
(45) Date of Patent: Jan. 10, 2012

(54) WHEEL ARRANGEMENT FOR A FOUR-WHEELED VEHICLE

(75) Inventor: Yu-Yin Peng, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 575 days.

(21) Appl. No.: 11/537,658

(22) Filed: Oct. 1, 2006

(65) Prior Publication Data

US 2007/0151777 A1 Jul. 5, 2007

(30) Foreign Application Priority Data

Dec. 29, 2005 (TW) ................................ 94147144 A (51) Int. Cl.
*B60K 1/00* (2006.01)
*B62D 61/00* (2006.01)
*B62D 61/02* (2006.01)
*B62D 61/04* (2006.01)
*B62D 61/08* (2006.01)

(52) U.S. Cl. ...................... 180/65.1; 180/65.51; 180/6.2; 180/6.24; 180/6.28; 180/6.48; 180/6.5; 180/21; 280/47.11

(58) Field of Classification Search ................. 180/65.1, 180/65.51, 6.2, 6.24, 6.28, 6.48, 6.5, 21; 280/647, 657, 47.11, 47.41
See application file for complete search history.

(56) References Cited

U.S. PATENT DOCUMENTS

| | | | | |
|---|---|---|---|---|
| 1,262,806 | A | * | 4/1918 | Kemble ........................ 180/205 |
| 2,076,722 | A | * | 4/1937 | Heinze ............................ 180/21 |
| 2,111,983 | A | * | 3/1938 | Massey ................... 280/124.103 |
| 2,222,904 | A | * | 11/1940 | Heaslet ............................ 280/92 |
| 2,485,770 | A | * | 10/1949 | Place ............................... 180/21 |
| 3,166,141 | A | * | 1/1965 | Shields et al. .................. 180/21 |
| 3,380,546 | A | * | 4/1968 | Rabjohn ......................... 180/15 |
| 3,700,059 | A | | 10/1972 | Sutton |
| 3,828,876 | A | | 8/1974 | Morelli |
| 4,063,611 | A | * | 12/1977 | Anderson ..................... 180/119 |
| 4,313,511 | A | | 2/1982 | Soo Hoo |

(Continued)

FOREIGN PATENT DOCUMENTS

CN 2325253 6/1999

(Continued)

*Primary Examiner* — J. Allen Shriver, II
*Assistant Examiner* — Bryan Evans
(74) *Attorney, Agent, or Firm* — WPAT., P.C.; Justin King (57) ABSTRACT

A wheel arrangement for a four-wheeled vehicle is comprised of a front wheel, two side wheels and a rear wheel, whereas the rear wheel is connected to the frame of the vehicle by a supporting base enabling the same to be steered freely while having a ground-touching point of the same to be biased from the axis of the supporting base by a distance, and the front wheel can be specified as a driving wheel, a free-rolling steering wheel or just a steering wheel with respect to actual requirement, and the two side wheels can be specified as a driving wheels or free-rolling wheels while enabling the axis of the two side wheels to be aligned to a straight line without sharing a same shaft. The wheel arrangement can be a rhombus configuration as the distances between the center of the front wheel and the centers of the two side wheels are the same as that of the center of the rear wheel and the centers of the two side wheels, or can be a diamond configuration as the distances between the center of the front wheel and the centers of the two side wheels are different from that of the center of the rear wheel and the centers of the two side wheels.

23 Claims, 7 Drawing Sheets

U.S. PATENT DOCUMENTS

| | | | |
|---|---|---|---|
| 4,324,301 A * | 4/1982 | Eyerly | 180/2.1 |
| 4,484,646 A * | 11/1984 | Smith | 180/6.2 |
| 4,750,578 A * | 6/1988 | Brandenfels | 180/13 |
| 4,775,021 A | 10/1988 | Marino | |
| 5,272,938 A | 12/1993 | Hsu et al. | |
| 6,089,341 A * | 7/2000 | Gingerich | 180/65.1 |
| 6,378,642 B1 * | 4/2002 | Sutton | 180/208 |

FOREIGN PATENT DOCUMENTS

| | | |
|---|---|---|
| CN | 1293134 | 5/2001 |
| CN | 2644264 | 9/2004 |
| CN | 1634737 | 7/2005 |
| CN | 1990328 | 7/2007 |
| EP | 1008508 | 6/2000 |
| EP | 1905675 | 4/2008 |
| FR | 1203898 | 1/1960 |
| GB | 841871 | 7/1960 |
| JP | 10-7043 | 1/1989 |
| JP | 2002276638 | 9/2002 |
| JP | 2005313720 | 11/2005 |
| TW | 182762 | 4/1992 |
| TW | 252621 | 12/2004 |
| TW | 268887 | 12/2006 |
| WO | 2005/021360 | 3/2005 |

* cited by examiner

WHEEL ARRANGEMENT FOR A FOUR-WHEELED VEHICLE

FIELD OF THE INVENTION

The present invention relates to a wheel arrangement for a four-wheeled vehicle, and more particularly, to a rhombus or diamond wheel arrangement capable of enabling a vehicle to perform a turn-in-spot without having additional mechanism to be installed thereon.

BACKGROUND OF THE INVENTION

Traffic is the everlasting nightmare for every metropolitan driver, and it is no truer when trying to find a parking place in any major city. To encounter this problem, a vehicle with ability to turn in tight space had been proposed. As the advance of motor and its control technology, some advanced vehicles, especially the rectangle four-wheeled vehicles, are configured with four wheel steering mechanism which cooperates with a motor-driven steering switching mechanism to enable two front wheels of the vehicle to be toe-in and two rear wheels to be toe-out so as to enable the vehicle to turn about in tight space by the help of a corresponding power system. Such vehicles can have good maneuverability and steering that is easy to park and turn around. However, mechanisms, components and controls for enabling a rectangle four-wheeled vehicle to turn-in-spot in tight space are quite complicated, bulky and heavy, moreover, it has adverse affects on wheel and chassis alignment. Particularly, for those smaller size automobiles running in downtown area with quite small internal spaces and the weight thereof are preferred to be reduced for fuel efficiency, the aforesaid four wheel steering mechanism enabling turn-in-spot must be simplified. In addition, the operations of negotiating a turn and making a U-turn in tight space of the rectangle four-wheeled vehicle using the aforesaid four wheel steering are independent to each other, which makes the operations of the mechanism even more complicate.

A three-wheeled vehicle with one front wheel and two rear wheels is much simpler at system complexity than rectangle four-wheeled vehicle (only two wheels need mechanism control), but the three-wheeled vehicle must enable the two rear wheels to toe-out while steering the front wheel to turn at 90 degrees for enabling the three-wheeled vehicle to turn-in-spot in tight space. Furthermore, without two rear wheels to toe-out, since the forgoing turn is centering about the intersection of the rear wheel shaft and the longitudinal shaft of the vehicle frame, the minimum turning radius is the front and rear wheelbase. Compared with the abovementioned four-wheeled vehicle with ability to turn in tight space, the turning radius of the three-wheeled vehicle is twice as large as that of the four-wheeled vehicle that the three-wheeled vehicle requires large space for turning.

As to patents of a rhombus four-wheeled vehicle, the representative patents include U.S. Pat. No. 1,262,806, entitled "Rolling Chair", U.S. Pat. No. 3,828,876, entitled "Motor Vehicle Having Wheels in a Diamond pattern", U.S. Pat. No. 4,313,511, entitled "Land Vehicle", U.S. Pat. No. 4,775,021, entitled "Automotive Vehicle Having Four Wheels in a Rhomboidal Configuration", and so on. The structure and shortcomings of the conventional rhombus four-wheel vehicles are described hereinafter in accordance with the technical means of the above patents.

Figure 1:
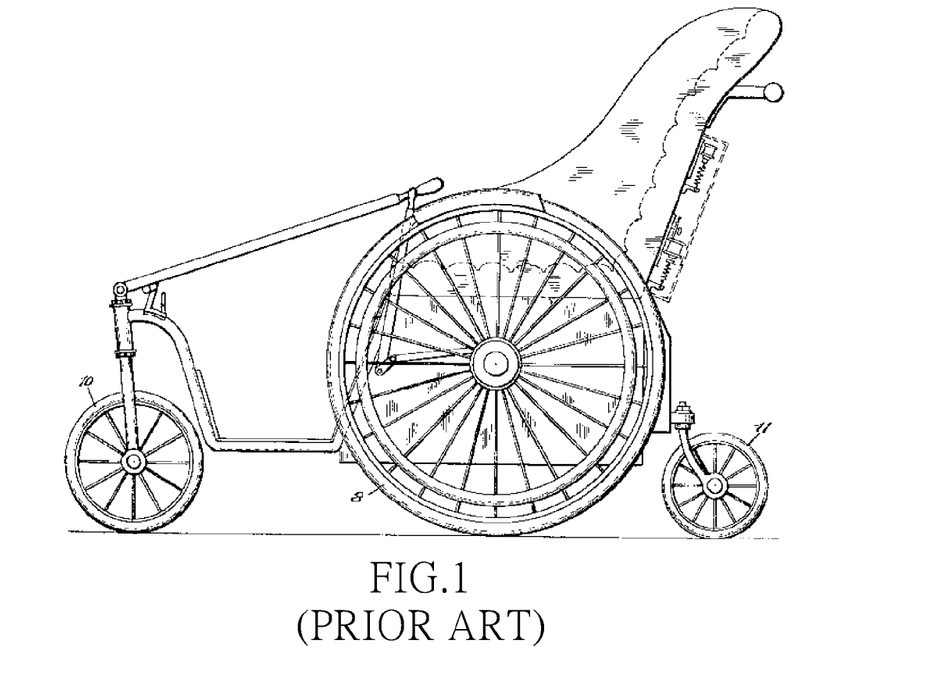
FIG. 1 is a schematic view of a conventional rhombus four-wheeled vehicle disclosed in U.S. Pat. No. 1,262,806.

Referring to FIG. 1, U.S. Pat. No. 1,262,806, entitled "Rolling Chair", is a pioneer US patent of a rhombus four-wheeled vehicle. The two side wheels 8 are coaxial without speed difference and are driven by an electric motor, whereas the front wheel 10 can be steered manually and the rear wheel 11 can roll freely. The shortcomings of the aforesaid patent are that the driving forces of the two side wheels 8 will interfere with each other while negotiating a turn that the four-wheeled vehicle fails to perform a U-turn in tight space.

Figure 2:
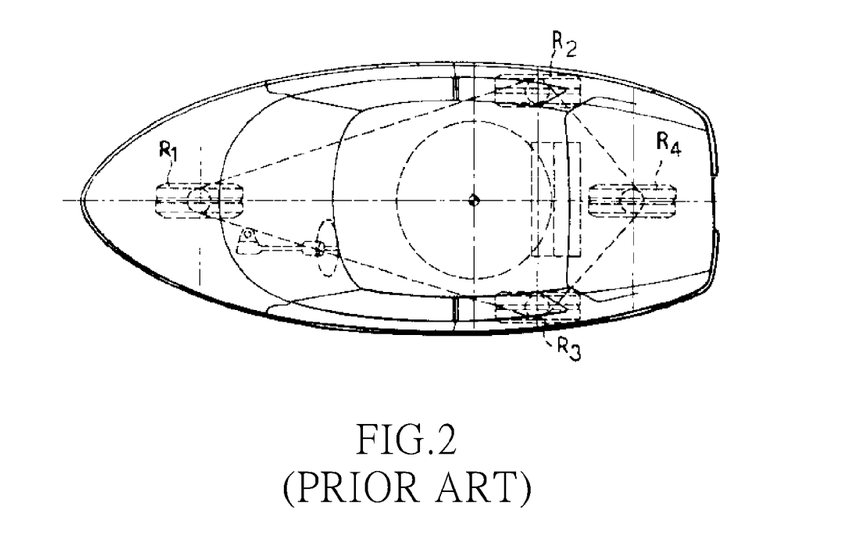
FIG. 2 is a schematic view of a conventional rhombus four-wheeled vehicle disclosed in U.S. Pat. No. 3,828,876.

Referring to FIG. 2, U.S. Pat. No. 3,828,876, entitled "Motor Vehicle Having Wheels in a Diamond Pattern" disclosed a vehicle having a front wheel R1 as a steering wheel and two side wheels R2, R3 employed as driving wheels, wherein the axis of the rear wheel R4 is arranged to parallel to the axis of the side wheels R2, R3 at all time while the rear wheel R4 is maintained to roll freely without turning. The shortcomings of the aforesaid patent are that: as the axles of the rear three wheels R2, R3, R4 are maintained to parallel to each other at all time while being arranged to perpendicular to the longitudinal shaft of the vehicle frame, the lateral force of the rear three wheels R2, R3, R4 exerting on the ground can interfere with each other such that the vehicle fails to perform a U-turn in tight space.

Figure 3:
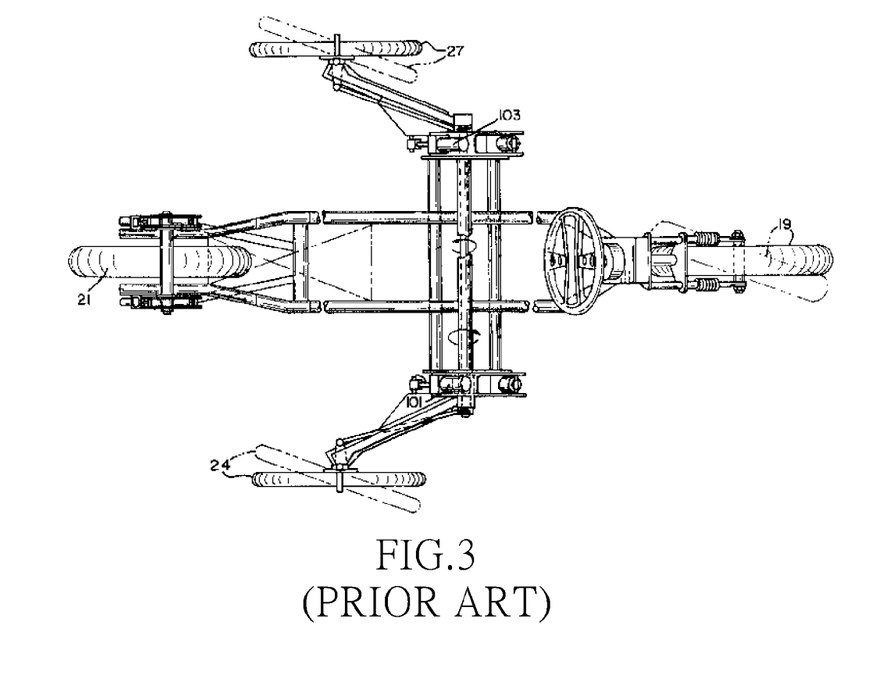
FIG. 3 is a schematic view of a conventional rhombus four-wheeled vehicle disclosed in U.S. Pat. No. 4,313,511.

Please to FIG. 3, which is a vehicle disclosed in U.S. Pat. No. 4,313,511, entitled "Land Vehicle". In the vehicle of FIG. 3, either the front wheel 19 or rear wheel 21 is employed as a steering wheel through mechanism control while disabling another for steering, and suspension systems 101, 103 of the two side wheels 24, 27 are controlled through mechanism control to incline inwardly during steering for simultaneously controlling two side wheels 24, 27 to turn with the steering wheel (i.e. the front wheel 19 or the rear wheel 21). The shortcomings of the aforesaid patent are that although the multiple-wheel control of the aforesaid patent can enhance maneuverability, it is complicated and fails to enable a vehicle to perform a U-turn in tight space.

Figure 4:
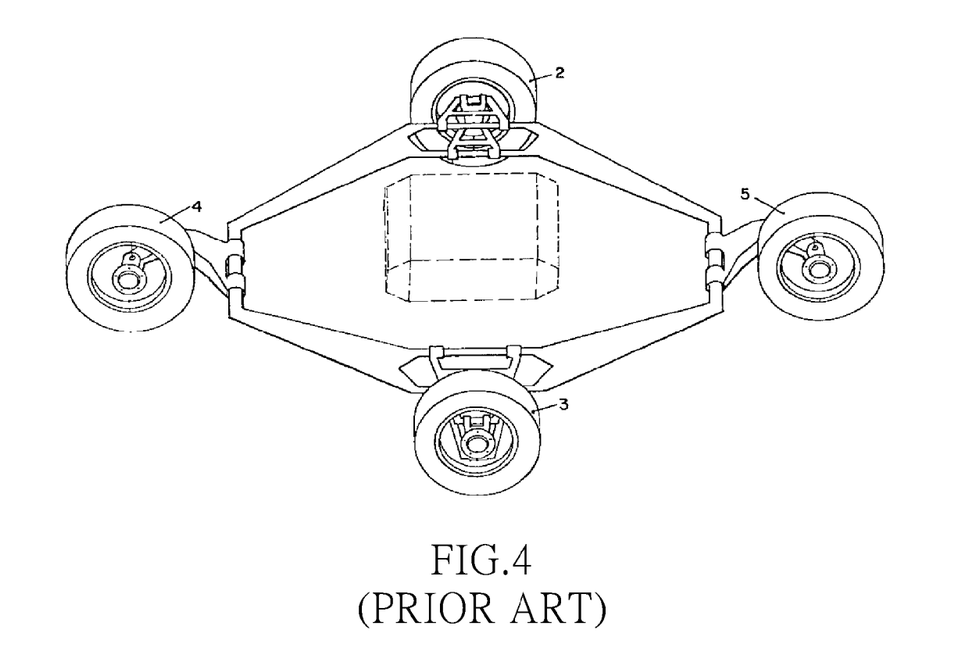
FIG. 4 is a schematic view of a conventional rhombus four-wheeled vehicle disclosed in U.S. Pat. No. 4,775,021.

Please refer to FIG. 4, which is a vehicle disclosed in U.S. Pat. No. 4,775,021, entitled "Automotive Vehicle Having Four Wheels in a Rhomboidal Configuration". The vehicle of FIG. 4 has four independent-suspended and independent-driven wheels 2~5, wherein the front and rear wheels 4, 5 are respectively suspended by an L-shaped arm, and a steering arm is additionally configured to cooperate with a steering rod extending through the vehicle frame for enabling the front and rear wheels 4, 5 to turn simultaneously and opposite to each other, thereby controlling over-steering. The shortcomings of the aforesaid patent are that it requires precise technology to control a multi-wheeled drive system and the vehicle fails to perform a U-turn in tight space.

SUMMARY OF THE INVENTION

In view of the disadvantages of prior art, the primary object of the present invention is to provide a wheel arrangement for a vehicle having four wheels in a rhombus or diamond configuration, capable of enabling the four-wheeled vehicle to perform a turn-in-spot without wheel toe-in/toe-out control mechanism, and thereby enabling the have the four-wheeled vehicle of the invention to have the same turning radius in place as a ordinary rectangle four-wheeled vehicle with wheel toe-in/toe-out control mechanism when the length of the vehicle frames or the wheelbases of the present invention is equal to that of the conventional rectangle four-wheeled vehicle.

Another object of the present invention is to provide a wheel arrangement for enabling a four-wheeled vehicle to have good maneuverability and steering.

Yet, another object of the present invention is to provide a wheel arrangement for a four-wheeled vehicle, which enables the four-wheeled vehicle to have a streamline shape with low drag coefficient, and thus greatly reduce fuel consumption in high speed traveling, and is especially fitted to be applied by small size vehicles since the vehicles of such wheel arrangement occupy less road area and thus increase using efficiency of a road while increasing flow of vehicles traveling thereon.

To achieve the above objects, the present invention provides a wheel arrangement for a four-wheeled vehicle of the present invention, which is comprised of a front wheel, two side wheels and a rear wheel, wherein the rear wheel is connected to the frame of the vehicle by a supporting base enabling the same to be steered freely while having a ground-touching point of the same to be biased from the axis of the supporting base by a distance, and the front wheel is specified as a driving wheel, a free-rolling steering wheel or just a steering wheel with respect to actual requirement, and the two side wheels can be specified as a driving wheels or free-rolling wheels while enabling the axes of the two side wheels to be aligned to a straight line without sharing a same shaft. The wheel arrangement can be a rhombus configuration as the distances between the center of the front wheel and the centers of the two side wheels are the same as that of the center of the rear wheel and the centers of the two side wheels, or can be a diamond configuration as the distances between the center of the front wheel and the centers of the two side wheels are different from that of the center of the rear wheel and the centers of the two side wheels.

Other objects, advantages and novel features of the present invention will be drawn from the following detailed embodiment of the present invention with attached drawings, in which:

DESCRIPTION OF THE PREFERRED EMBODIMENTS

Figure 5:
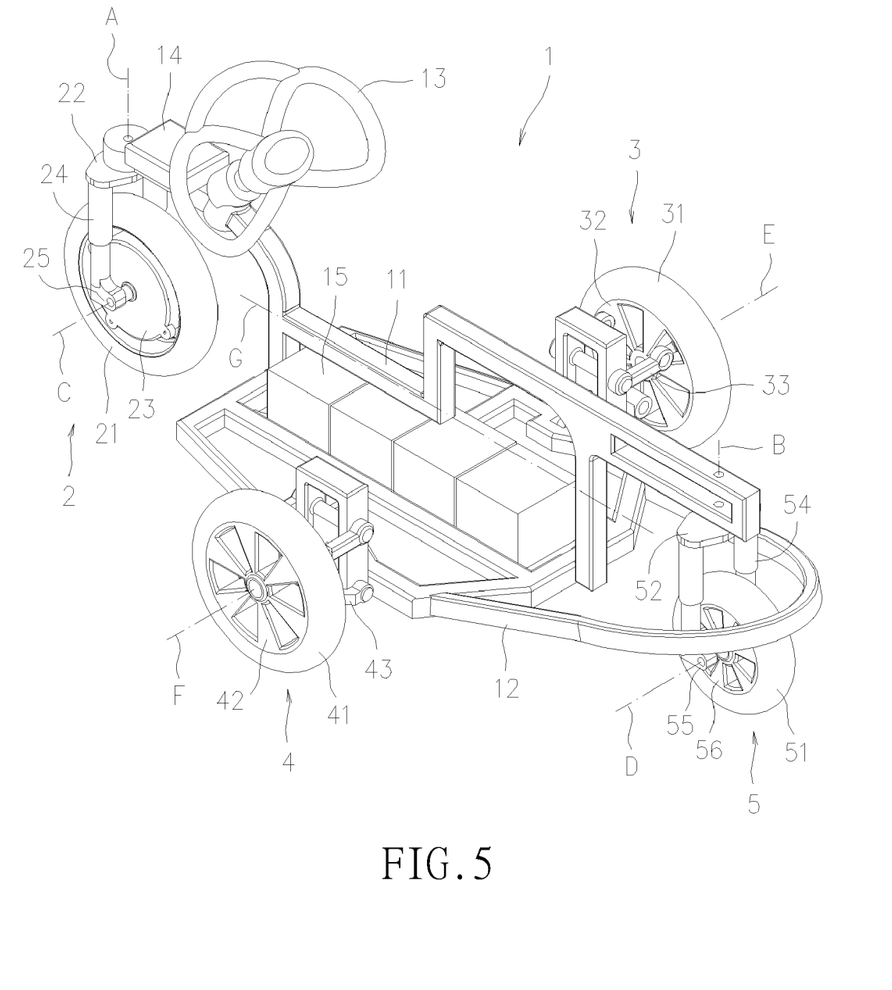
FIG. 5 is a perspective view of a wheel arrangement for a four-wheeled vehicle of the present invention.
Figure 6:
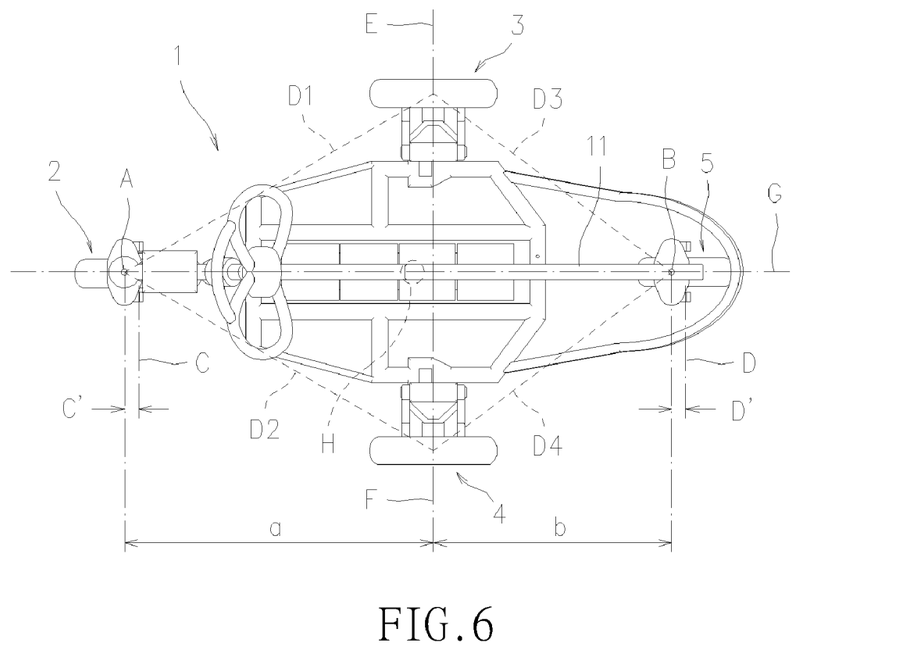
FIG. 6 is a top plan view of FIG. 5.
Figure 7:
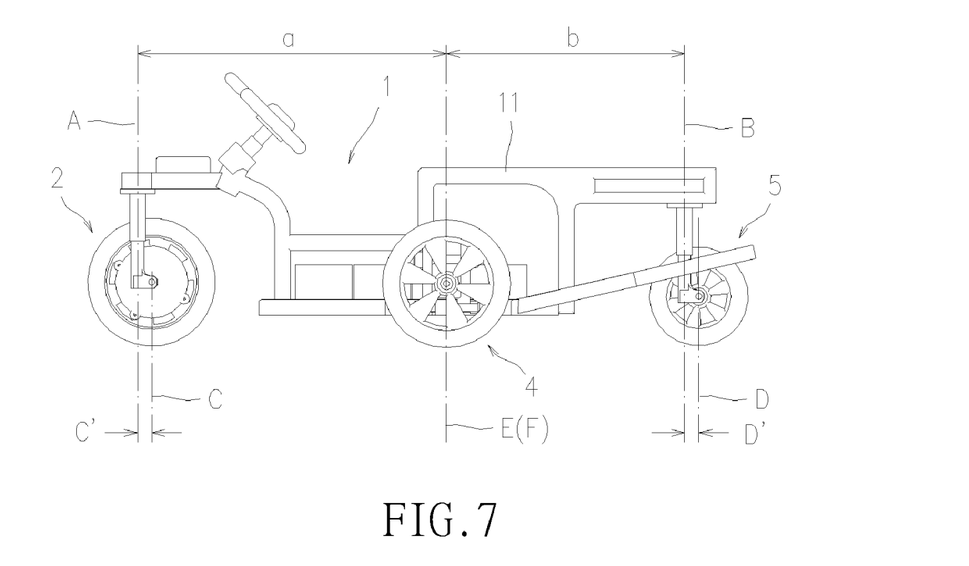
FIG. 7 is a side elevation view of FIG. 5.

Referring to FIGS. 5-7, which are respectively a perspective view, a top plan view and a side elevation view of a wheel arrangement for a four-wheeled vehicle in accordance with a preferred embodiment of the present invention. The four-wheeled vehicle 1 includes a vehicle frame 11 and a chassis 12. Wherein, the front wheel unit 2, having a front wheel 21 and a pivoting axis A, is disposed at the front of the vehicle frame 11 by connecting the same to the front segment of the vehicle frame 11 using a supporting base 22. In addition, the vehicle frame 11 further comprises a steering device 13 (illustrated as a shape of a steering wheel, shown in FIG. 1), which is connected to the front wheel unit 2 through a switching mechanism 14. It is noted that the switching mechanism 14 can be a mechanical structure or an electronic or electrical system. A driver can control the steering device 13 to drive the front wheel unit 2 to steer around the pivoting axis A through the switching mechanism 14. The maximum steering angle of the front wheel unit 2 is no more than 90 degrees to the right or 90 degrees to the left. The front wheel unit 2 further includes a shock absorber 24 having a resilient member and a damper (not shown). The shock absorber 24 is disposed between the supporting base 22 and a shaft supporting portion 25 connecting the axis C of the front wheel 21. The point of the pivoting axis A of the front wheel unit 2 projected on the ground is biased from the point of the axis C of the front wheel 21 projected on the ground by a distance C' (as shown in FIG. 7). Therefore, the reacting force at the ground-touching point of the front wheel 21 and the moment caused by the biased distance C' enable the front wheel unit to keep progressing straightly. A hub motor 23 is disposed at the front wheel 21, which is powered by a battery pack 15 disposed on the vehicle frame 11. The driver can control the hub motor 23 to drive the four-wheeled vehicle 1 to move, which is prior art and so is not described herein. It is noted that the front wheel 21 can be driven by a motor-in-wheel instead of the hub motor 23.

Furthermore, right and left side wheel units 3, 4 are respectively disposed at opposite sides of a middle segment of the vehicle frame 11. The right side wheel unit 3 includes a right side wheel 31, a hub 32, and a suspension system 33. The right side wheel 31 can roll freely around the axis E thereof. The suspension system 33 is connected with the chassis 12 to enable the right side wheel unit 3 to be an independently suspended and freely rolling wheel unit. Similarly, the left side wheel unit 4 includes a left side wheel 41, a hub 42, and a suspension system 43. The left side wheel 41 can freely roll around the axis F. The suspension system 43 is connected with the chassis 12 to enable the left side wheel unit 4 to be an independently suspended and freely rolling wheel unit. The axis E of the right side wheel unit 3 and the axis F of the left side wheel unit 4 are collinear and are perpendicular to the longitudinal axis G of the vehicle frame 11. The axis E and the axis F are not connected directly.

Secondly, a rear wheel unit 5 is disposed at the rear of the vehicle frame 11, which includes a rear wheel 51 and a pivoting axis B. The rear wheel unit 5 is connected to the rear segment of the vehicle frame 11 by another supporting base 52. The rear wheel unit 5 may be steered freely within 360 degrees about the axis B. The rear wheel unit 5 further includes a shock absorber 54 having a resilient member and a damper (not shown). The shock absorber 54 is disposed between the supporting base 52 and a shaft supporting portion 55 connecting the axis D of the rear wheel 51. The axis D is biased from the pivoting axis B of the rear wheel unit 5 by a distance D' (as shown in FIG. 7). The hub 56 can freely steer about the axis D. When the four-wheeled vehicle 1 progresses, the force from the ground-touching point of the rear wheel 51 and the moment caused by the biased distance D' enables the rear wheel unit 5 to freely rotate about the axis B. Thus, the rear wheel unit 5 can adjust itself to align to the progressing direction of the vehicle 1.

Referring to FIGS. 6 and 7, it must be illuminated that in accordance with the four-wheeled vehicle formed by the front wheel unit 2, the right side wheel unit 3, the left side wheel unit 4 and the rear wheel unit 5, the pivoting axis A, B of the front and rear wheel units 2, 5 are located on the longitudinal axis G of the vehicle frame 11, and the right and left side wheel units 3, 4 are isometrically disposed at the opposite sides of the longitudinal axis G of the vehicle frame 11. Thus, the distance D1, D2, respectively measured from the front wheel unit 2 to the right side wheel unit 3 and the left side wheel unit 4, are equal. The distance D3, D4, respectively measured from the rear wheel unit 5 to the right and left side wheel units 3, 4, are equal. When the axis E, F locate at the center of the front and rear wheel units 2, 5, the wheelbase a of the front wheel and the wheelbase b of the rear wheel are equal, and the distance D1~D4 of the wheel units are equal thereby forming a rhombus wheel arrangement. Contrarily, when the front wheelbase a and the rear wheelbase b are not equal, a diamond wheel arrangement is formed (as shown in the dashed of FIG. 6). Furthermore, the front and rear wheelbase a, b are configured equal or unequal in accordance with the requirement of the actual driving performance of the four-wheeled vehicle and the difference of application manner. However, the CG (center of gravity position) H must be configured between the axis C of the front wheel and the axis E, F of the side wheels.

Figure 8:
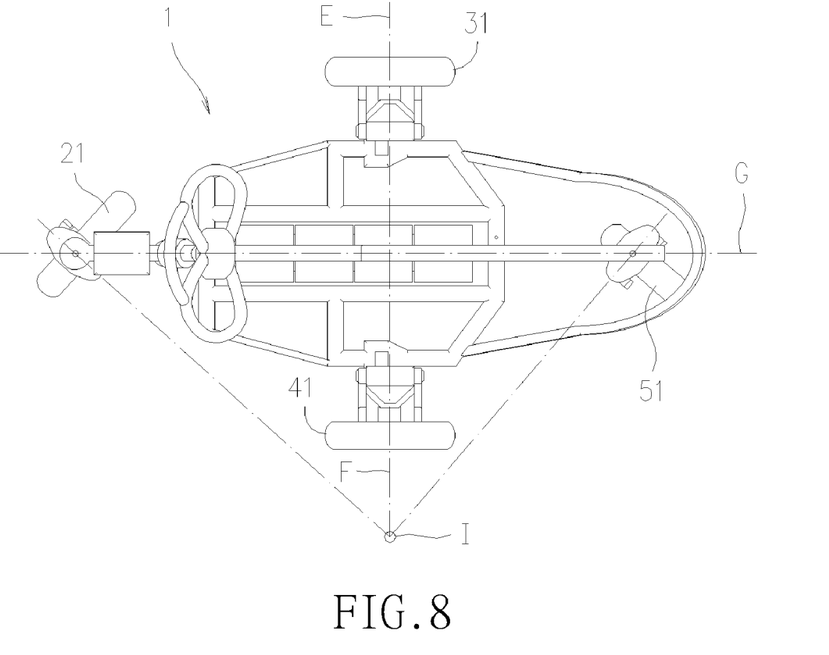
FIG. 8 shows the meeting of the axis of four wheels of a four-wheeled vehicle while it is negotiating a turn according to the present invention.
Figure 9:
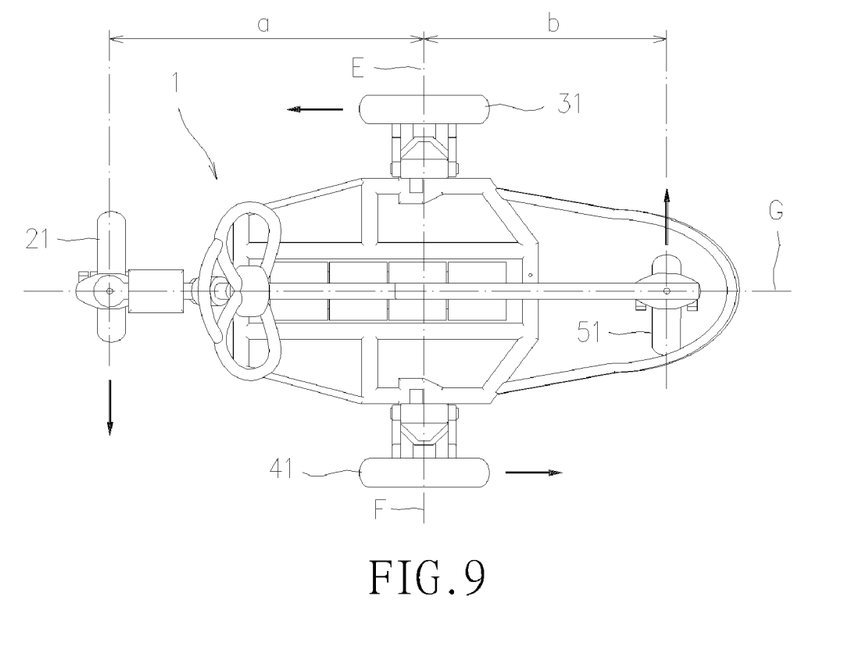
FIG. 9 shows the meeting of the axis of four wheels of a four-wheeled vehicle while it is perform a turn-in-spot according to the present invention.

Compared with the conventional rhombus vehicle (as shown in FIGS. 1-4), since the rear wheel unit 5 of the present invention can freely steer and can forward the CG to the front wheelbase a, the load of the front wheel unit 2 may be configured to be relatively larger, which fits to front wheel drive and so prevents skid of the front wheel drive wheel. Further referring to FIG. 8, when the four-wheeled vehicle of the present invention turns (illustrating status of turning left), the rolling axis C, D, E, F of the four wheels 21, 31, 41, 51 meet at a same turning center I thereby avoiding unstable oversteering caused by interference of side forces of the four wheels 21, 31, 41, 51 during negotiating a turn. Referring to FIG. 9, when the front wheel 21 is perform a near 90 degrees left turn which is perpendicular to the longitudinal axis G of the vehicle frame, the right side wheel 31 is rolling forward and the left side wheel 41 is rolling opposite thereto while the rear wheel 51 is free to be steer following the direction of the turn. Thus, the four-wheeled vehicle 1 can perform a turn-in-spot, i.e. a stationary turn of gyration. When the front wheelbase a is larger than the rear wheelbase b, the turning radius of the stationary turn of gyration of the four-wheeled vehicle 1 is almost equal to the front wheelbase a.

Figure 10A:
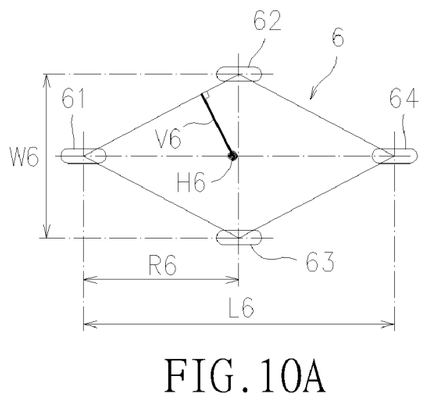
FIG. 10A is a schematic diagram illustrating a wheel arrangement of a rhombus vehicle according to the present invention.
Figure 10B:
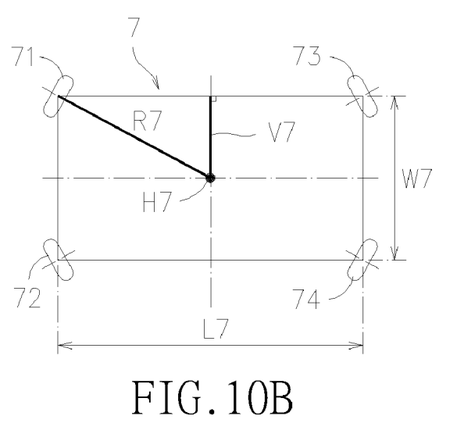
FIG. 10B is a schematic diagram illustrating a wheel arrangement of a conventional rectangle four-wheeled vehicle.

Referring to FIG. 10A showing a schematic view of a rhombus four-wheeled vehicle of the present invention, and FIG. 10B showing a schematic view of a conventional rectangle four-wheeled vehicle, the front and rear wheelbase L6 and the right and left side tread W6 of the rhombus four-wheeled vehicle 6 are equal to the front and rear wheelbase L7 and the right and left side tread W7 of the rectangle four-wheeled vehicle 7. Regarding to the static safety factor (SSF), higher SSF means stronger anti-rolling and anti-overturn capability. The value of the SSF, in rectangular vehicle, is equal to the ratio of the length W of a perpendicular line from the CG to the connection line of the front and rear wheels to height h of the CG, that is, SSF=W/h. Therefore, when the height of the CG is the same, the longer length W of the perpendicular line from the CG to the connection line of the front and rear wheels means the larger SSF. As shown in FIGS. 10A and 10B, when the height of the CG is the same, the perpendicular line V7 from the CG H7 of the rectangle four-wheeled vehicle to the connection line of the front and rear wheels is longer than the perpendicular line V6 from the CG H6 of the rhombus four-wheeled vehicle to the connection line from the front and side wheels whereby the value of SSF of the rectangle four-wheeled vehicle is larger than that of the rhombus four-wheeled vehicle. As to a small size vehicle with a narrow vehicle frame, that is treads W6, W7 of the right and left side wheels are narrow, the difference of the value of SSF of the rectangle four-wheeled vehicle and the rhombus four-wheeled vehicle is very small. As shown in FIGS. 10A and 10B, while performing a station turn of gyration, the turning radius R6 of the rhombus four-wheeled vehicle is slightly smaller than the turning radius R7 of the rectangle four-wheeled vehicle (the length from the CG to the wheel 71). When the rectangle four-wheeled vehicle 7 needs the four wheels 71~74 to simultaneously turn, the front wheels 71, 72 must turn to be toe-in, and the rear wheels 73, 74 must turn to be toe-out, which requires extremely complicated mechanism and control and even adversely affects the wheel position. When the rhombus four-wheeled vehicle 6 of the present invention is performing a station turn of gyration, only the steering of the front wheel 61 is under control, the other three wheels 62~64 can roll freely, and the rear wheel can self-steer (simultaneously referring to FIG. 9) whereby it does not need an additional mechanism and driving force for controlling. Accordingly, as to the function of station turn of gyration, the rhombus four-wheeled vehicle of the present invention is advantageous.

Figure 11A:
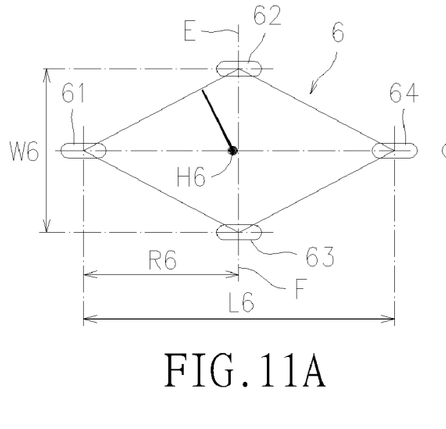
FIG. 11A is a schematic diagram illustrating a wheel arrangement of a rhombus vehicle according to the present invention.
Figure 11B:
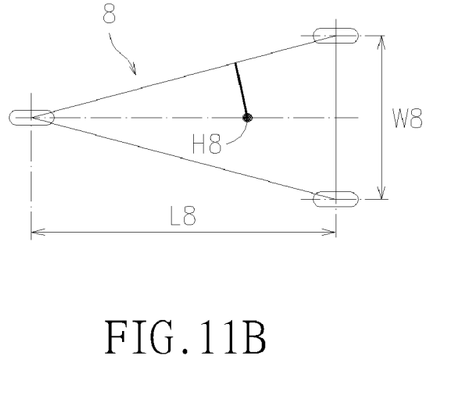
FIG. 11B is a schematic diagram illustrating a wheel arrangement of a conventional three-wheeled vehicle.

Referring to FIG. 11A showing a schematic view of a rhombus four-wheeled vehicle, and FIG. 11B showing a schematic view of a conventional three-wheeled vehicle, the front and rear wheelbase L6 and the right and left side tread W6 of the rhombus four-wheeled vehicle 6 are equal to the front and rear wheelbase L8 and the right and left side tread W8 of the three-wheeled vehicle 8. To consider drivability and prevent from backwards inclining during accelerating, the CG H8 of the three-wheeled vehicle 8 must be moved forwards. Since the rhombus four-wheeled vehicle 6 has the rear wheel 64, the CG H6 of the rhombus four-wheeled vehicle can be configured to extremely close the axis E, F of the two side wheels 62, 63. Thus, when the heights of the CGs are equal, the value of the SSF of the rhombus four-wheeled vehicle 6 is greater than that of the three-wheeled vehicle whereby the rhombus four-wheeled vehicle has more anti-rolling capability.

Figure 12A:
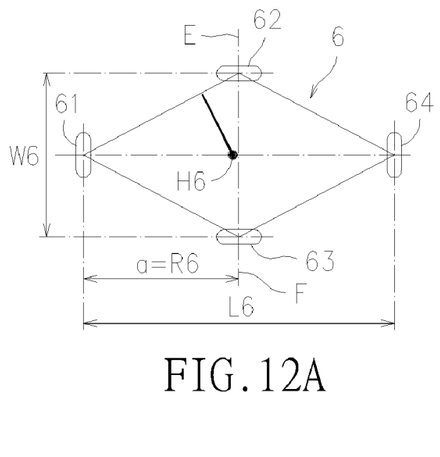
FIG. 12A shows a turning radius of a four-wheeled vehicle while it is perform a turn-in-spot.
Figure 12B:
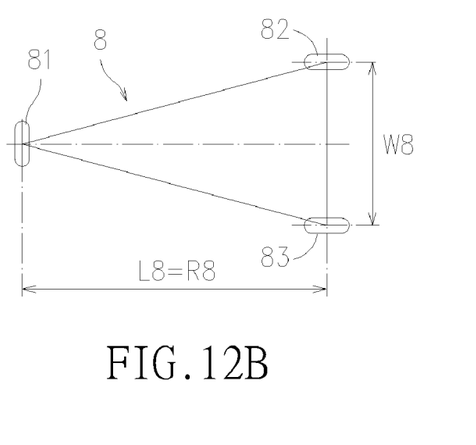
FIG. 12B shows a turning radius of a conventional three-wheeled vehicle while it is perform a turn-in-spot.

Referring to FIGS. 12A and 12B, as shown in FIG. 12A (simultaneously referring to FIG. 9) the front and rear wheelbase L6 and the right and left side tread W6 of the rhombus four-wheeled vehicle 6 are equal to the front and rear wheelbase L8 and the right and left side tread W8 of the three-wheeled vehicle 8. When the front wheel 61 of the rhombus four-wheeled vehicle 6 of the present invention is turned 90 degrees and the rear wheel 64 reversely turns 90 degrees for performing a station turn of gyration, the turning radius R6 of the vehicle 6 is the front wheelbase a. When the three-wheeled vehicle 8 is performing a station turn of gyration as the front wheel turns 90 degrees, the turning radius R8 is the wheelbase L8 of the front and rear wheels as the front wheel 81 is the driving wheel and the rear wheels can freely roll. Comparatively, since the front and rear wheelbase L6 of the rhombus four-wheeled vehicle 6 is equal to the front and rear wheelbase L8 of the three-wheeled vehicle 8, the turning radius R6 of the rhombus four-wheeled vehicle 6 is half of the turning radius R8 of the three-wheeled vehicle 8 thereby greatly reducing space for turning.

Figure 5A:
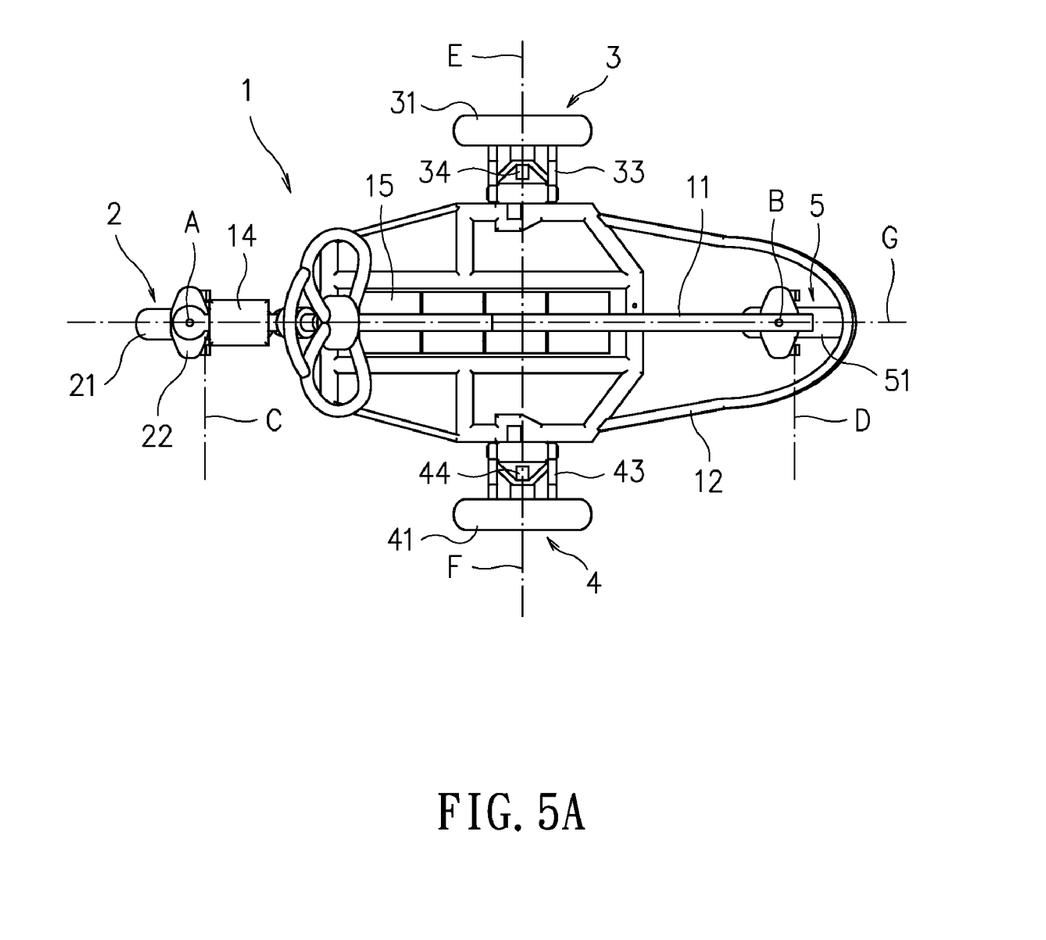
FIG. 5A is a top plan view of a wheel arrangement for a four-wheeled vehicle of the present invention having power unit on the side wheel.

Further referring to FIG. 5 and FIG. 5A, in the preferred embodiment, the front wheel unit 2 has the driving force, and the steering operation device 13 is operated to steer the front wheel unit 2 through the switching mechanism 14. The right and left side wheel units 3, 4 and the rear wheel unit 5 can freely roll. It must be noted that besides the above arrangement, the front wheel unit 2 may be configured to steer only, the right and left wheel units 3, 4 are configured as driving wheels having motors 34 and 44 disposed there on respectively, and the rear wheel unit 5 is configured to steer freely, or the front wheel unit 2, the right and left side wheel units 3, 4 are configured as driving wheels, the front wheel unit 2 is still configured to steer and the rear wheel unit 5 is configured to steer freely, or the front and rear wheel units 2, 5 are configured to steer freely, the right and left side wheel units 3, 4 are configured as driving wheels, but the wheel units 3, 4 can individually control power output, rolling direction and speed. The power transmission, speed and direction of rotation of the foregoing driving wheel can be controlled through a driving control unit or mechanism (not shown, belonging to prior art and so not described herein). When the driver controls steering operation device 13, the driver intent can be transmitted to the control unit through the switching mechanism 14. When the front wheel unit 2 turns approximately 90 degrees, the driving control mechanism of the right and left side wheel units 3, 4 can be actuated to enable one of the right and left side wheel units 3, 4 to forwards roll and the other to rearwards roll whereby the four-wheeled vehicle can fix a position to turn in place. The power and rotation speed of the right and left side wheel units 3, 4 decide the vehicle to straightly progress, steer or performing a stationary turn of gyration. When the front and rear wheel units 2, 5 both can steer freely, the front wheel can naturally turn to the progressing direction during swerving or performing a stationary turn of gyration without additional driving mechanism.

As described above, the wheel arrangement for a four-wheel vehicle of the present invention has a rhombus or diamond configuration and can have the same radius of turning in place as a rectangle four-wheeled vehicle having switching mechanism for turning in place without additional steering control mechanism when the length of the vehicle frames or the wheelbases of the present invention and the conventional four-wheeled vehicle are equal. Compared with a three-wheeled vehicle, the wheel arrangement for a four-wheel vehicle of the present invention has more advantages. The wheel arrangement for a four-wheel vehicle of the present invention upgrades drivability and motility. The streamline shaped four-wheeled vehicle of the invention has a low wind resistance coefficient which greatly reduces fuel consumption during high speed traveling. The wheel arrangement for a four-wheel vehicle of the present invention is especially fitted to be applied by small size vehicles since the vehicles of such wheel arrangement occupy less road area and thus increase using efficiency of a road while increasing flow of vehicles traveling thereon.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A wheel arrangement for a four-wheeled vehicle, having capability of performing stationary turn of gyration, comprising:
   a vehicle frame having a front segment, a first vertical segment, a first middle segment, a second vertical segment, a second middle segment, a third vertical segment, and a rear segment, wherein
      said front segment, said first vertical segment, and said first middle segment are connected and adjacent to each other;
      said first middle segment connects to said second middle segment via said second vertical segment
      said second middle segment, said third vertical segment, and said rear segment are connected and adjacent to each other; and
      said first middle segment is lower than said second middle segment and said rear segment;
   a vehicle chassis positioned below and adjacent to said vehicle frame;
   a front wheel, coupled to the front segment of the vehicle frame, having abilities of driving and steering, wherein a steering angle of the front wheel toward one side is less than 90 degrees;
   two side wheels, coupled to opposite sides of said chassis, capable of rolling freely and individually while enabling the axis of the two side wheels to be aligned to a straight line without sharing a same shaft; and
   a rear wheel, coupled to the rear segment of the vehicle frame, capable of being turned and steered freely while being connected to a vehicle frame of the four-wheeled vehicle by a supporting base, wherein the rear wheel is rotatable within 360 degrees about the axis of the supporting base;
   wherein the front wheel, the two side wheels, and the rear wheel, remain in contact with the surface the vehicle rests upon at all times during normal operation;
   wherein the vehicle performs a turn-in-spot when the front wheel is turned such that the steering angle causes the vehicle to rotate in place about a point defined at the intersection of a longitudinal axis of the vehicle frame defined by a line going through the pivoting axes of the front and rear wheels, and a traverse axis of the vehicle frame defined by the collinear alignment of the axes of the two side wheels; and
   wherein the two side wheels are isometrically disposed at the opposite sides of the longitudinal axis of the vehicle frame so that the distance respectively measured from the front wheel to the two side wheels are equal and the distance respectively measured from the rear wheel to the two side wheels are equal.

2. The wheel arrangement of claim 1, wherein the driving ability of the front wheel is enabled by a hub motor or a motor-in-wheel.

3. The wheel arrangement of claim 1, wherein the steering of the front wheel is enabled by manpower.

4. The wheel arrangement of claim 1, wherein the four wheels is arranged in a rhombus configuration while the distances measured from the centers of the two side wheels to the center of the front wheel, and those to the center of the rear wheel are all equal.

5. The wheel arrangement of claim 1, wherein the four wheels is arranged in a diamond configuration while the distances measured from the centers of the two side wheels to the center of the front wheel are not equal to the distances measured from the center of the rear wheel to the centers of the two side wheels.

6. The wheel arrangement of claim 1, wherein the front wheel is connected with a switching mechanism and a steering device for steering control.

7. The wheel arrangement of claim 1, wherein the point of the pivoting axis of the front wheel projected on the ground is biased from the point of the center of the front wheel projected on the ground by a distance.

8. The wheel arrangement of claim 1, wherein the two side wheels are respectively connected to the vehicle frame by a hub and a suspension system.

9. A wheel arrangement for a four-wheeled vehicle, having capability of performing stationary turn of gyration, comprising:
a vehicle frame having a front segment, a first vertical segment, a first middle segment, a second vertical segment, a second middle segment, a third vertical segment and a rear segment, wherein
said front segment, said first vertical segment, and said first middle segment are connected and adjacent to each other;
said first middle segment connects to said second middle segment via said second vertical segment
said second middle segment, said third vertical segment, and said rear segment are connected and adjacent to each other; and
said first middle segment is lower than said second middle segment and said rear segment;
a vehicle chassis positioned below and adjacent to said vehicle frame;
a front wheel, coupled to the front segment of the vehicle frame, having steering ability, wherein a steering angle of the front wheel toward one side is less than 90 degrees;
two side wheels, coupled to opposite sides of said chassis, capable of respectively issuing a driving force for driving the four-wheeled vehicle while enabling the axis of the two side wheels to be aligned to a straight line without sharing a same shaft, each side wheel having power output, wherein the driving forces of the two side wheels are respectively enabled by an motor driven by electrical power and the rolling direction of the two side wheels can be opposite to each other; and
a rear wheel, capable of being turned and steered freely while being connected to a the rear segment of the vehicle frame of the four-wheeled vehicle by a supporting base;
wherein the front wheel, the two side wheels, and the rear wheel, remain in contact with the surface the vehicle rests upon at all times during normal operation;
wherein the vehicle performs a turn-in-spot when the front wheel is turned such that the steering angle causes the vehicle to rotate in place about a point defined at the intersection of a longitudinal axis of the vehicle frame defined by a line going through the pivoting axes of the front and rear wheels, and a traverse axis of the vehicle frame defined by the collinear alignment of the axes of the two side wheels; and
wherein the two side wheels are isometrically disposed at the opposite sides of the longitudinal axis of the vehicle frame so that the distance respectively measured from the front wheel to the two side wheels are equal and the distance respectively measured from the rear wheel to the two side wheels are equal.

10. The wheel arrangement of claim 9, wherein the front wheel is driven by a hub motor or a motor-in-wheel.

11. The wheel arrangement of claim 9, wherein the steering of the front wheel is enabled by manpower.

12. The wheel arrangement of claim 9, wherein the front wheel is enabled to be turned and steered freely while the each of the two side wheels is enabled to control individually its power output, rotation direction and rotation speed.

13. The wheel arrangement of claim 12, wherein the front wheel is connected to the vehicle frame by a supporting base.

14. The wheel arrangement of claim 13, wherein the ground-touching point of the front wheel is any one point of a circle surrounding the point of the axis of the supporting base projected on the ground.

15. The wheel arrangement of claim 9, wherein the motor has a controller for controlling the rotation speeds and rolling directions of the two side wheels in accordance with a steering angle of the front wheel.

16. The wheel arrangement of claim 9, wherein the two side wheels are enabled to rotate independently and toward different directions.

17. The wheel arrangement of claim 9, wherein the four wheels is arranged in a rhombus configuration while the distances measured from the centers of the two side wheels to the center of the front wheel, and those to the center of the rear wheel are all equal.

18. The wheel arrangement of claim 9, wherein the four wheels is arranged in a diamond configuration while the distances measured from the centers of the two side wheels to the center of the front wheel are not equal to the distances measured from the center of the rear wheel to the centers of the two side wheels.

19. The wheel arrangement of claim 9, wherein the ground-touching point of the rear wheel is any one point of a circle surrounding the point of the axis of the supporting base projected on the ground.

20. The wheel arrangement of claim 9, wherein the front wheel is connected with a switching mechanism and a steering device for steering control.

21. The wheel arrangement of claim 9, wherein the point of the pivoting axis of the front wheel projected on the ground is biased from the point of the center of the front wheel projected on the ground by a distance.

22. The wheel arrangement of claim 9, wherein the two side wheels are respectively connected to the vehicle frame by a hub and a suspension system.

23. The wheel arrangement of claim 9, wherein the front wheel is enabled to issue a driving force similar to that of each side wheel.

* * * * *